(12) United States Patent
Rafferty et al.

(10) Patent No.: US 12,217,178 B2
(45) Date of Patent: *Feb. 4, 2025

(54) COMPUTER-BASED SYSTEMS CONFIGURED FOR DETECTING AND SPLITTING DATA TYPES IN A DATA FILE AND METHODS OF USE THEREOF

(71) Applicant: Capital One Services, LLC, McLean, VA (US)

(72) Inventors: Galen Rafferty, Mahomet, IL (US); Reza Farivar, Champaign, IL (US); Jeremy Goodsitt, Champaign, IL (US); Anh Truong, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 112 days.

This patent is subject to a terminal disclaimer.

(21) Appl. No.: 18/295,153

(22) Filed: Apr. 3, 2023

(65) Prior Publication Data

US 2023/0244939 A1 Aug. 3, 2023

Related U.S. Application Data

(63) Continuation of application No. 17/014,394, filed on Sep. 8, 2020, now Pat. No. 11,620,520, which is a continuation of application No. 16/667,451, filed on Oct. 29, 2019, now Pat. No. 10,789,532.

(51) Int. Cl.
*G06N 3/08* (2023.01)
*G06F 17/18* (2006.01)
*G06F 40/166* (2020.01)
*G06F 40/284* (2020.01)
*G06N 20/10* (2019.01)

(52) U.S. Cl.
CPC ............ *G06N 3/08* (2013.01); *G06F 17/18* (2013.01); *G06F 40/166* (2020.01); *G06F 40/284* (2020.01); *G06N 20/10* (2019.01)

(58) Field of Classification Search
CPC .......... G06N 3/08; G06N 20/10; G06F 17/18; G06F 40/02
See application file for complete search history.

(56) References Cited

U.S. PATENT DOCUMENTS

| 8,489,388 B2 | 7/2013 | Bonnet et al. |
| 9,721,002 B2 | 8/2017 | Pfeifer et al. |
| 2004/0133598 A1 | 7/2004 | Dobrowski et al. |

(Continued)

*Primary Examiner* — Li Wu Chang
(74) *Attorney, Agent, or Firm* — Greenberg Traurig, LLP

(57) ABSTRACT

A method for training a neural network model includes generating a training dataset with a plurality of data types and word samples belonging to each data type. A plurality of character strings stored in a plurality of data fields in a first data file are received where the plurality of character strings includes at least one word belonging to at least one data type in the plurality of data types. The at least one word from each of the plurality of character strings in each of the data fields are split and matched to the at least one data type using the neural network model. An ad hoc second data file with a plurality of data vectors is constructed based on a user selection of data field labels where each data vector includes words matched to a data type with a respective data field label.

16 Claims, 11 Drawing Sheets

(56) References Cited

U.S. PATENT DOCUMENTS

2015/0095312 A1     4/2015   Gulwani et al.
2019/0266452 A1*   8/2019   Tsuda .................. G06V 30/416
2019/0385001 A1   12/2019   Stark

* cited by examiner

FIG. 3

| | A | B | C |
|---|---|---|---|
| 1 | Date | city | state |
| 2 | 01/02/2001 | Chicago | IL |
| 3 | 01/03/2001 | Chicago | IL |
| 4 | 01/04/2001 | Chicago | IL |
| 5 | 01/05/2001 | Chicago | IL |
| 6 | 01/06/2001 | Chicago | IL |
| 7 | 01/07/2001 | Chicago | IL |
| 8 | 01/08/2001 | Chicago | IL |
| 9 | 01/09/2001 | Chicago | IL |
| 10 | 01/10/2001 | Chicago | IL |
| 11 | ... | ... | ... |
| 12 | | | |

| a1 | wwxxyyy | b1 | —205 |
| a2 | wwxxyyy | b2 |
| a3 | wwxxyyy | b3 | —207 |
| a4 | wwxxyyy | b4 | —205 |
| a5 | wwxxyyy | b5 | —207 |
| · | · | · |
| · | · | · |
| · | · | · |

205 (left side pointing to a3)

| a1 | wwxxyyy | b1 |
| a2 | wwxxyyy | b2 |
| a3 | wwxxyyy | b3 |
| a4 | wwxxyyy | b4 |
| a5 | wwxxyyy | b5 | —207 |
| · | · | · |
| · | · | · |
| · | · | · |

255 (pointing to a1–a4)

Data Profiler
There appear to be multiple data types in this single field. Would you like to split it into fields?

250 {
- ◉ Split ww ‖ xx ‖ yyy
- ◉ Split wwxx ‖ yyy
- ◉ Split ww ‖ xx ‖ yyy
- ◉ No split

| a1 | ww | xx | yyy | b1 |
|----|----|----|-----|----|
| a2 | ww | xx | yyy | b2 |
| a3 | ww | xx | yyy | b3 |
| a4 | ww | xx | yyy | b4 |
| a5 | ww | xx | yyy | b5 |
| .  | .  | .  | .   | .  |
| .  | .  | .  | .   | .  |
| .  | .  | .  | .   | .  |

COMPUTER-BASED SYSTEMS CONFIGURED FOR DETECTING AND SPLITTING DATA TYPES IN A DATA FILE AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computer-based systems for detecting and splitting data types in a data file and methods of use thereof.

BACKGROUND OF TECHNOLOGY

A computer network platform/system may include a group of computers (e.g., clients, servers, smart routers and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of:
generating, by a processor, a training dataset for at least one neural network model;
wherein the training dataset may include a plurality of data types and word samples belonging to each data type in the plurality of data types;
training, by a processor, the at least one neural network model using the training dataset;
wherein the at least one neural network model matches a specific word sample to a specific data type in the plurality of data types;
receiving, by a processor, a plurality of character strings stored in a plurality of data fields in a first data file;
wherein the plurality of character strings may include at least one word belonging to at least one data type in the plurality of data types;
inputting, by a processor, the plurality of character strings from the first data file into the at least one neural network model;
splitting, by the processor, the at least one word from each of the plurality of character strings in each of the data fields in the plurality of data fields in the first data file using the at least one neural network model;
matching, by the processor, the at least one word split from each of the plurality of character strings to the at least one data type from the plurality of data types using the at least one neural network model;
wherein the plurality of data types is respectively represented by a plurality of data field labels;
outputting by the processor, data field labels from the plurality of data field labels matched to the at least one word split from the plurality of character strings from the first data file;
receiving, by the processor, an ad hoc selection of at least one data field labels from a user;
constructing, by the processor, an ad hoc second data file with a plurality of data vectors based on the selection;
wherein each data vector in the plurality of data vectors may include data fields for words matched to each of the at least one selected data field labels; and
storing in the data fields, by the processor, the at least one word split from the plurality of character strings for each data type from the plurality of data types matched to each of the at least one selected data field labels.

In some embodiments, the present disclosure provides an exemplary technically improved computer-based system that includes at least the following components of a memory and a processor. The processor may be configured to:
generate a training dataset for at least one neural network model;
wherein the training dataset may include a plurality of data types and word samples belonging to each data type in the plurality of data types;
train the at least one neural network model using the training dataset;
wherein the at least one neural network model matches a specific word sample to a specific data type in the plurality of data types;
receive a plurality of character strings stored in a plurality of data fields in a first data file;
wherein the plurality of character strings may include at least one word belonging to at least one data type in the plurality of data types;
input the plurality of character strings from the first data file into the at least one neural network model;
split the at least one word from each of the plurality of character strings in each of the data fields in the plurality of data fields in the first data file using the at least one neural network model;
match the at least one word split from each of the plurality of character strings to the at least one data type from the plurality of data types using the at least one neural network model;
wherein the plurality of data types is respectively represented by a plurality of data field labels;
output data field labels from the plurality of data field labels matched to the at least one word split from the plurality of character strings from the first data file;
receive an ad hoc selection of at least one data field labels from a user;
construct an ad hoc second data file with a plurality of data vectors based on the selection;
wherein each data vector in the plurality of data vectors may include data fields for words matched to each of the at least one selected data field labels; and
store the at least one word split from the plurality of character strings for each data type from the plurality of data types matched to each of the at least one selected data field labels.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 illustrates a first data file with each data field split according to the detected data words, in accordance with one or more embodiments of the present disclosure;

FIG. 4 illustrates an ad hoc second data file, in accordance with one or more embodiments of the present disclosure;

FIG. 5 illustrates a second embodiment of a first data file, in accordance with one or more embodiments of the present disclosure;

FIG. 6 illustrates a second embodiment of a first data file with an information box, in accordance with one or more embodiments of the present disclosure;

FIG. 7 illustrates a second embodiment of an ad hoc second data file, in accordance with one or more embodiments of the present disclosure;

DETAILED DESCRIPTION

Figure 1:
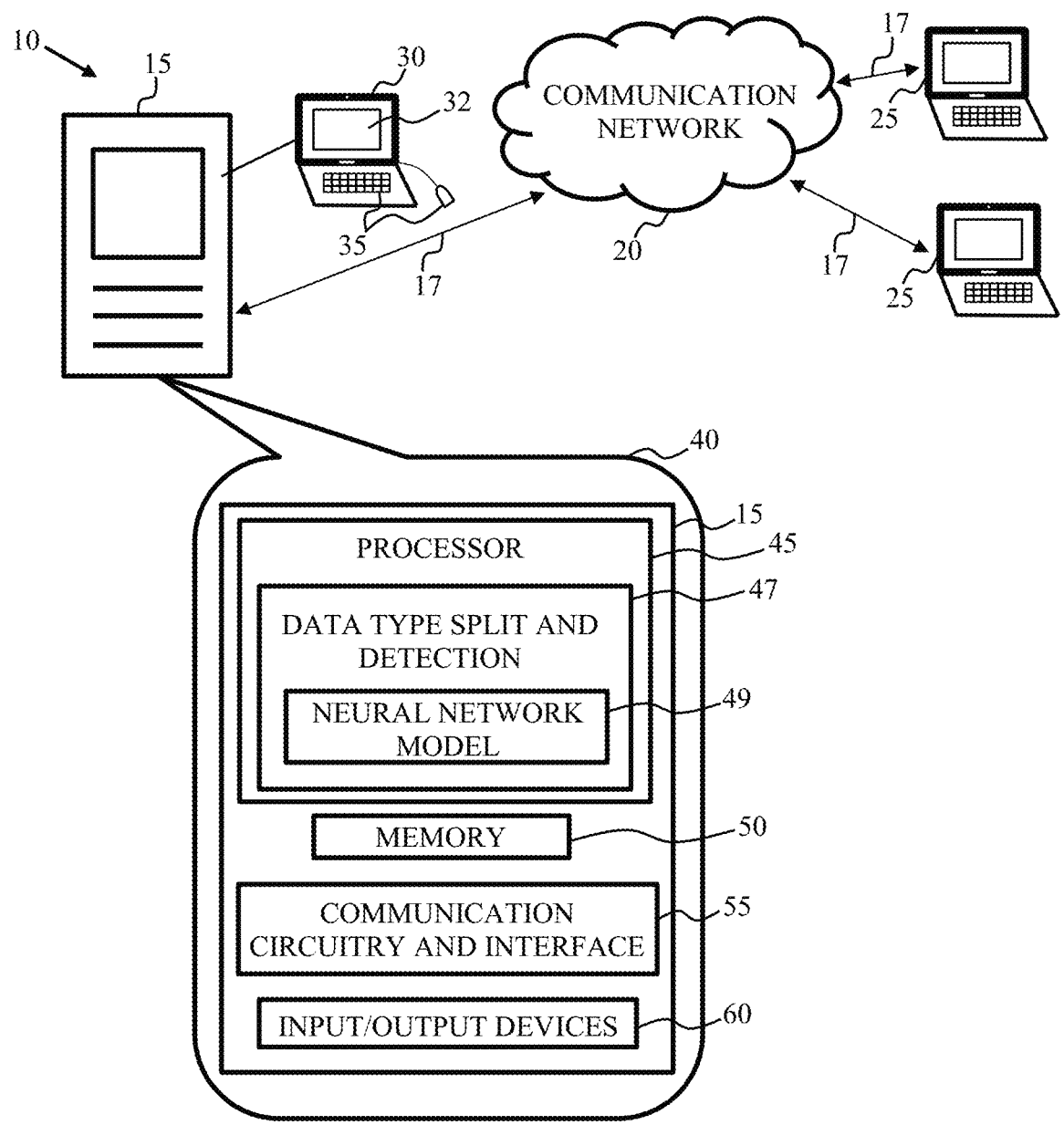
FIG. 1 depicts an exemplary inventive system for detecting and splitting data types in a data file, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe computer-based systems for detecting and splitting data types in a data file and methods of use thereof. A computing system may receive a first data file, which may include strings of characters in a plurality of data fields of the first data file. A data file may be a data table, spreadsheet (e.g., Excel spreadsheet), a key-value store, such as a JSON object or AVRO file, or a database file, for example. The character strings may include at least one word of at least one data type. The computing system may be configured to split the at least one work belonging to the at least one data type from the character strings stored in the plurality of data fields, such as spreadsheet cells, for example, in the first data file. The computing system may report to a user, a report of all the different types found in the detected words in the first data file split from the character strings. The user may select the data types of interest. In response, the computing system may construct an ad hoc second data file from the split words matched to the user-selected data types in a user-selected format.

In many instances, large data sets stored data in multiple data fields in a data file such as a spreadsheet may include multiple words or pieces of data in character strings stored in a single data field, sometimes without the use of any delimiters. To process each of these character strings in multiple data fields and to extract the multiple words stored therein for use in a variety of data applications may be a very complex and time intensive computing process for large data sets. The embodiments taught herein solve this technical problem for detecting and splitting heterogeneous pieces of data in respective character strings stored in the data fields of the data file leveraging the use of neural network models. The neural network models may be used to match and/or classify each of the split pieces of data to a respective data type. An ad hoc second data file may be constructed using the split data from the first data file classified into data types according to the user-defined preferences or attributes.

FIG. 1 depicts an exemplary inventive system 10 for detecting and splitting data types in a data file, in accordance with one or more embodiments of the present disclosure. Computing system 10 may include a server 15 communicating 17 over a communication network 20 with remote computers 25. As shown in an inset 40, server 10 may include a processor 45, a memory 50, input and output devices 60, and communication circuitry and interface 55 for communicating 17 over communication network 20. Input and output devices 60 may include, for example, a terminal 30 coupled to server 15 further including a display 32 and a keyboard/mouse 35.

Processor 15 may be configured to execute code of a Data Type Split and Detection 47 software (SW) module, which may use a neural network model 49, to perform all of the functions described hereinbelow. Memory 60 may be used to store the large data sets in the data file and the ad hoc second data file constructed using the Data Type Split and Detection 47 software module. In other embodiments, Data Type Split and Detection 47 software module may be executed by a processor (not shown) of remote computers 25. Remote computers 25 may each include a processor, a memory, input/output devices, and communication circuitry (not shown). In yet other embodiments, each of remote computers 25 may act as a remote terminal for server 15 for receiving data and user preferences from a user, which are relayed to server 15 over communication network 20. Processor 45 on server 15 may then construct the ad hoc second data file. The ad hoc second data file may then be relayed over communication network 20 and outputted on a display of any of remote computers 25.

Figure 2:
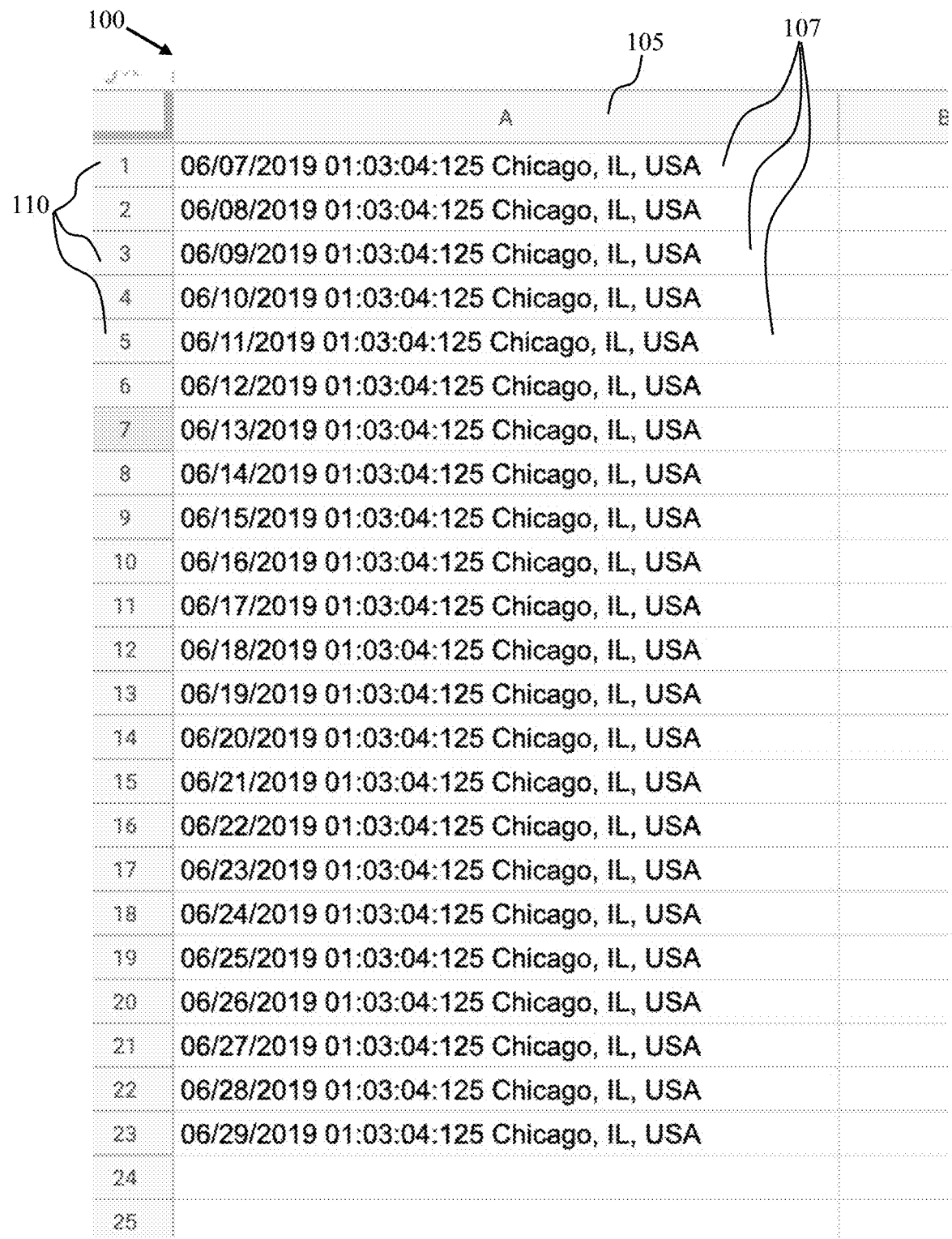
FIG. 2 illustrates a first data file, in accordance with one or more embodiments of the present disclosure.

FIG. 2 illustrates a first data file 100, in accordance with one or more embodiments of the present disclosure. First data file 100 may be displayed on display 32. First data file 100 may be a spreadsheet with an array of a plurality of data fields 107 arranged in rows and columns. In the example shown in FIG. 1, first data file 100 may include one column 105 of rows 100 of data fields 107. Each of the data fields 107 comprises character strings with data words such as a date (e.g., Jun. 7, 2019, Jun. 8, 2019, etc.), a time (01:03:04;125), and a location with city, state, and country (e.g., Chicago, IL, USA). Each of the exemplary character strings shown in FIG. 2 have these data words concatenated together with no delimiters, such that the beginning and the end of each of the data words cannot be readily distinguished. The data types for each of these sets of data words may include "date", "time", "city", "state", and "country"

In some embodiments, processor 45 executing Data Type Split and Detection 47 software module may be used to detect each of the data words in each of the character strings and to split off each of the detected data words in each of the character strings. Processor 45 may then match and/or classify each split data word from each of the character strings into a specific data type.

Figure 3:
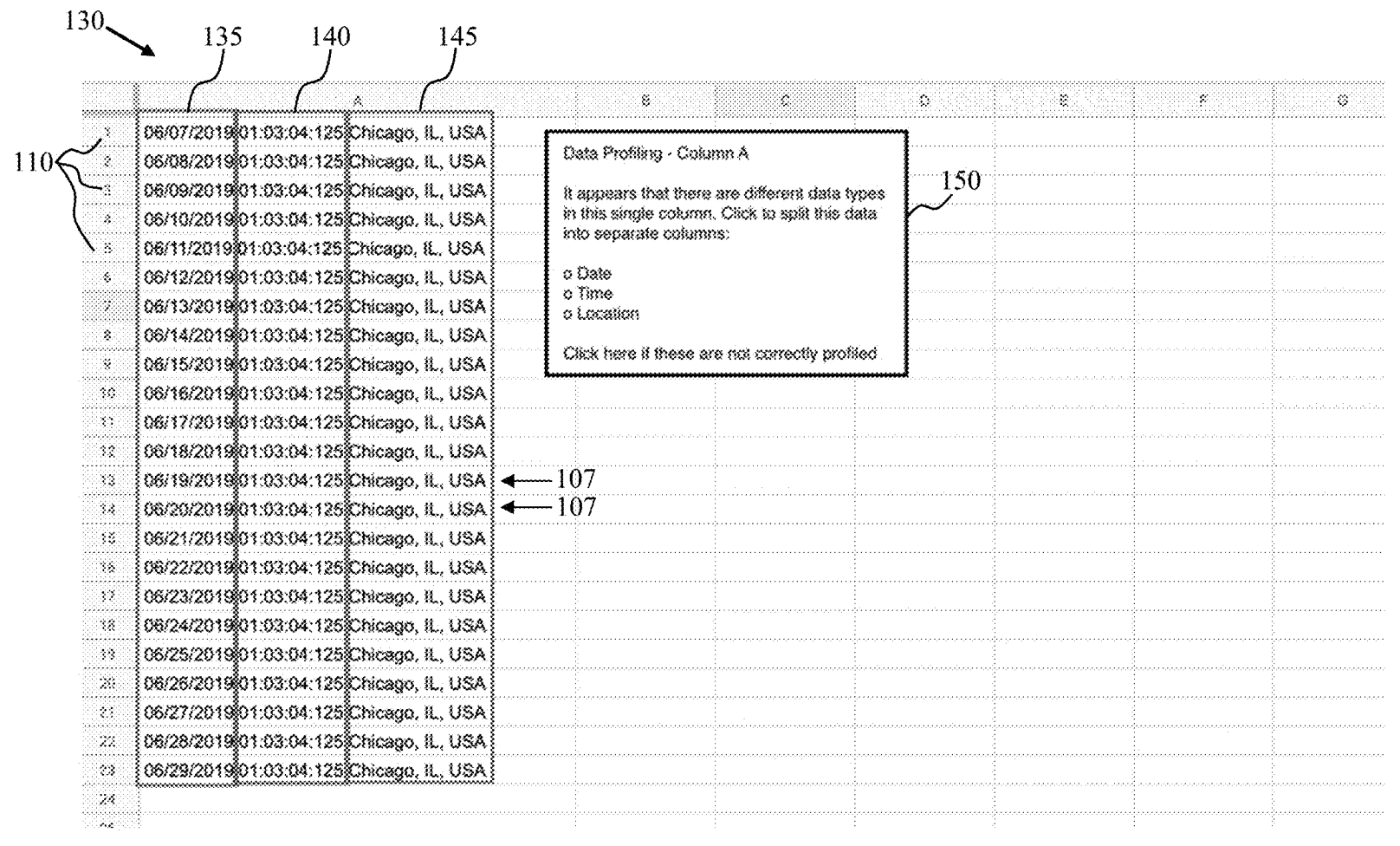

FIG. 3 illustrates a first data file 130 with each data field 107 split according to the detected data words, in accordance with one or more embodiments of the present disclosure. First data file 130 may be displayed on a display, such as display 32, for example. For each row 110 of data fields arranged in single column 105 denoted column A, processor 45 may profile the character string in each data field 107 as having data words of three data types.

In some embodiments, processor 45 may cause display 32 to display vertical dividing box indicia profiling and highlighting the different data types of data words in the character strings of each single data field in column 105. First data file 130 shown in FIG. 3 is first data file 100 with the vertical dividing box indicia superimposed for visual clarity. For example, a first box 135 designates the date in the character string of each data field 107 of data type "date". Similarly, a second box 140 designates the time in the character string in each data field 107 of data type "time", and a third box 145 designates the location in the character string in each data field 107 of data type "location".

In some embodiments, an information box 150 may be opened on display 32, for example, indicating to the user that there are different data types of data identified in the single column as highlighted by the vertical dividing box indicia. Information box 150 may give, for example, the user options to either split the identified data types into single columns or to indicate whether the data in data fields 107 was correctly profiled. In other embodiments, information box 150 may include options (not shown here) for the user to select the data type labels and/or data type formats (e.g., user preferences).

FIG. 4 illustrates an ad hoc second data file 160, in accordance with one or more embodiments of the present disclosure. Ad hoc second data file 160 may include a first column 162 with data fields in each row 161 with a data type label 163 denoted "Date", a second column 164 with data fields in each row 161 with a data type label 164 denoted "City", and a third column 168 with data fields in each row 161 with a data type label 169 denoted "State". Processor 45 may construct ad hoc second data file 160 where the data in each of data fields 166 in the three columns was detected and split from the character strings in data fields 107 in the single column first data file 100. Note that in this case, the user may request that the location may be further profiled into "city", "state" and "country" and choose only "city" and "state" as in this case shown in FIG. 4.

The embodiments shown in FIGS. 2-4 are merely for conceptual clarity and not by way of limitation of the embodiments of the present disclosure taught herein. For example, the first data file may include any number of columns and is not limited to a single column as shown in FIG. 2. Each character string in the data field may have any number of data words from which processor 45 may detect and split.

In some embodiments, processor 45 may construct the ad hoc second data file where the data field for each data type may be arranged in rows instead of columns. Accordingly, the data fields in the ad hoc second data able may include data fields arranged in data vectors (e.g., a term used herein to generically denote either a row or a column) where each data field in a data vector may include a word of a single data type split from the character strings of the data fields in the first data file. Furthermore, the data types are not limited to date, time, and location as shown in the exemplary embodiments, but may also include, but not limited to, any suitable data type such as Social Security numbers, government ID numbers, IP addresses, passwords, cities, first/last names, E-mail addresses, and the like.

In some embodiments, processor 45 may use neural network model 49 to identify segments of text (e.g., data words) in the character strings which belong to a specific data class or data type. Processor 45 may input the character string into neural network model 49, which may analyze each character (e.g., character-by-character), and/or groups of characters in the input character string. Processor 45 may assign a probability that a character and/or groups of characters in the input character string belong to a specific data type in a predefined set of data types. The predefined set of data types may be defined when training neural network model 49.

In some embodiments, processor 45 may then analyze the assigned probabilities for each character and/or groups of characters to determine distributions of assigned probabilities so as to assess from the distributions where unique data words in the character strings input to neural network model 49 start and end. Stated differently, processor 45 may use the assigned probability of each character belong to each data class in the predefined set of data classes to assess where to partition the character string into the unique data words found in each data field of the first data file. Processor 45 may assess the assigned probabilities to partition the characters and/or groups of characters into a unique word for a particular data type when the probabilities are greater than a predefined threshold, for example, such as 90%. Processor 45 may match the data word to a data type in the predefined set of data types.

In some embodiments, neural network model 49 may be, but not limited to, a classifier neural network model, a convolutional neural network (CNN) model, a recurrent neural network (RNN) model, or a multilayer perceptron network, for example.

In some embodiments, neural network model 49 may be trained using training datasets assembled from word samples from a corpus belonging to each data type. For example, the training dataset may include a plurality of street addresses for the data type "address", or a plurality of cities for the data type "city" and so forth. In other embodiments, a P in the character string preceded or followed by numbers may be indicative of a telephone number so each of those number characters in the character string after P may have a higher probability of belonging to the data type "Phone Number", for example. In yet other embodiments, named entity recognition services may be used to generate data for the training dataset.

In some embodiments, in the case where the first data file may have character strings with missing data words, the ad hoc second data file may have a blank in the corresponding field. For example, if there are character strings in the first data file with a date, time and a location except for a few data fields with missing time data, processor 45 (e.g., neural network model 49) may assess that there is missing data. Processor 45 may leave the corresponding fields empty in the data vector with the corresponding data type "time" when processor 45 detects that the user-preferences instructs processor 45 to construct the ad hoc second data file with a data vector having the "time" data label.

FIG. 5 illustrates a second embodiment of a first data file 200, in accordance with one or more embodiments of the present disclosure. First data file 200 may include three columns of data fields: a first column 210 with data fields 205, a second column 220 with data field 207, and a third column 230 with data fields 205. The data in first column 210 and third column 230 are each of a single data type that may be generically denoted as a1, a2, . . . an, and b1, b2, . . . , bn where n is an integer number of rows. However, data fields 207 in second column 220 may include character strings of multiple data types x,y, and z, for example, of the format wwxxyyy.

FIG. 6 illustrates a second embodiment of a first data file 200 with an information box 240, in accordance with one or more embodiments of the present disclosure. Processor 45 may detect that data fields 207 in each of rows 255 may include more than data type (e.g., data types x, y, and z). Information box 245 may inform the user that the multiple data types exist and may allow the user to split the data into a variety of column formats by choosing a radio button 230 in information box 240. The user then chooses the format ww|xx|yyy, for example, processor 45 may split the data in data fields 207 accordingly as shown in the next figure.

FIG. 7 illustrates a second embodiment of an ad hoc second data file 300, in accordance with one or more embodiments of the present disclosure. Processor 45 may define five data vectors and may construct ad hoc second data file 300 by arranging the five data vectors into five respective columns with rows 305 as follows: a first column 310 having the same data fields with data type a1 . . . an, a second column 320 with data fields 325 having data type of the format ww, a third column 330 with data fields 335 having data type of the format xx, a fourth column 320 with data fields 345 having data type of the format yyy, and a fifth column 350 310 having the same data fields with data type b1 . . . bn.

Figure 8:
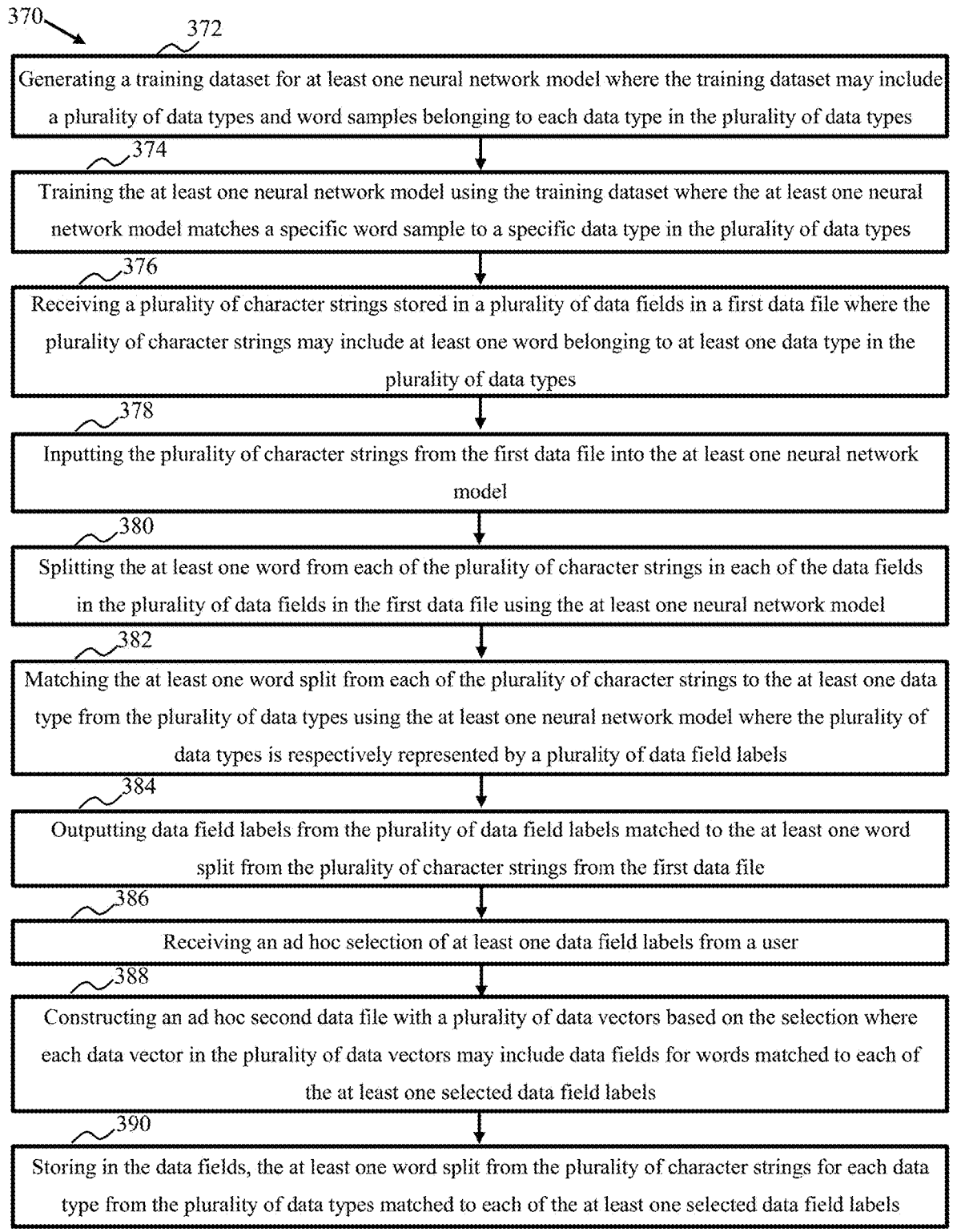
FIG. 8 illustrates a flowchart of a method for detecting and splitting data types in a data file, in accordance with one or more embodiments of the present disclosure.

FIG. 8 illustrates a flowchart of a method 300 for detecting and splitting data types in a data file, in accordance with one or more embodiments of the present disclosure. Method 300 may be performed by processor 15 executing data type split and detection 47 software module, for example.

Method 370 may include generating 372 a training dataset for at least one neural network model where the training dataset may include a plurality of data types and word samples belonging to each data type in the plurality of data types.

Method 370 may include training 374 the at least one neural network model using the training dataset where the at least one neural network model matches a specific word sample to a specific data type in the plurality of data types.

Method 370 may include receiving 376 a plurality of character strings stored in a plurality of data fields in a first data file where the plurality of character strings may include at least one word belonging to at least one data type in the plurality of data types.

Method 370 may include inputting 378 the plurality of character strings from the first data file into the at least one neural network model.

Method 370 may include splitting 380 the at least one word from each of the plurality of character strings in each of the data fields in the plurality of data fields in the first data file using the at least one neural network model.

Method 370 may include matching 382 the at least one word split from each of the plurality of character strings to the at least one data type from the plurality of data types using the at least one neural network model where the plurality of data types is respectively represented by a plurality of data field labels.

Method 370 may include outputting 384 data field labels from the plurality of data field labels matched to the at least one word split from the plurality of character strings from the first data file.

Method 370 may include receiving 386 an ad hoc selection of at least one data field labels from a user.

Method 370 may include constructing 388 an ad hoc second data file with a plurality of data vectors based on the selection where each data vector in the plurality of data vectors may include data fields for words matched to each of the at least one selected data field labels.

Method 370 may include storing 390 in the data fields, the at least one word split from the plurality of character strings for each data type from the plurality of data types matched to each of the at least one selected data field labels.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch;

(29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MDS, RIP-EMD-160, RTRO, SHA-1, SHA-2, Tiger (TTH), WHIRLPOOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 9:
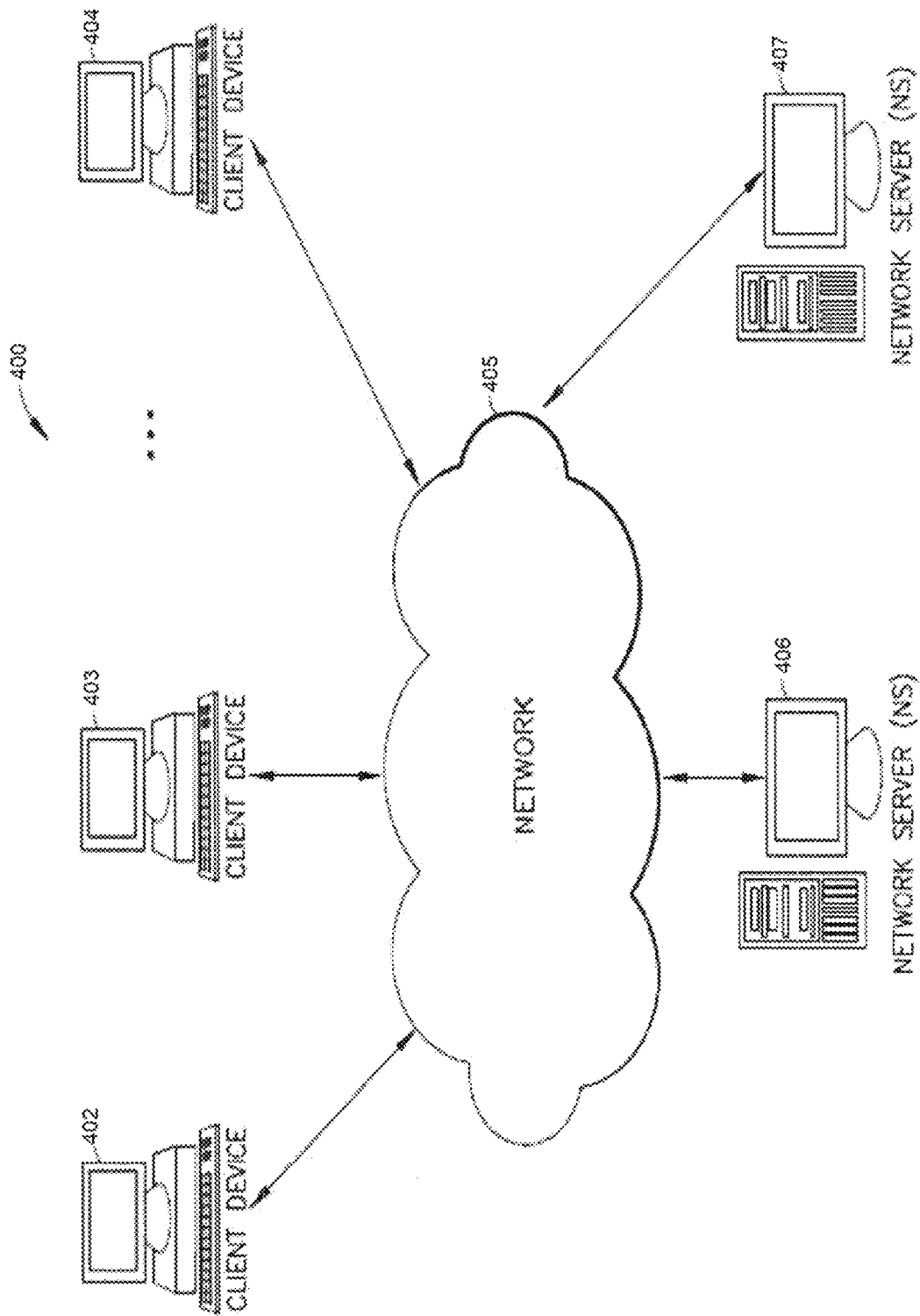
FIG. 9 depicts a block diagram of an exemplary computer-based system/platform in accordance with one or more embodiments of the present disclosure.

FIG. 9 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 9, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 9, in some embodiments, the exemplary server 406 or the exemplary server

407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 10:
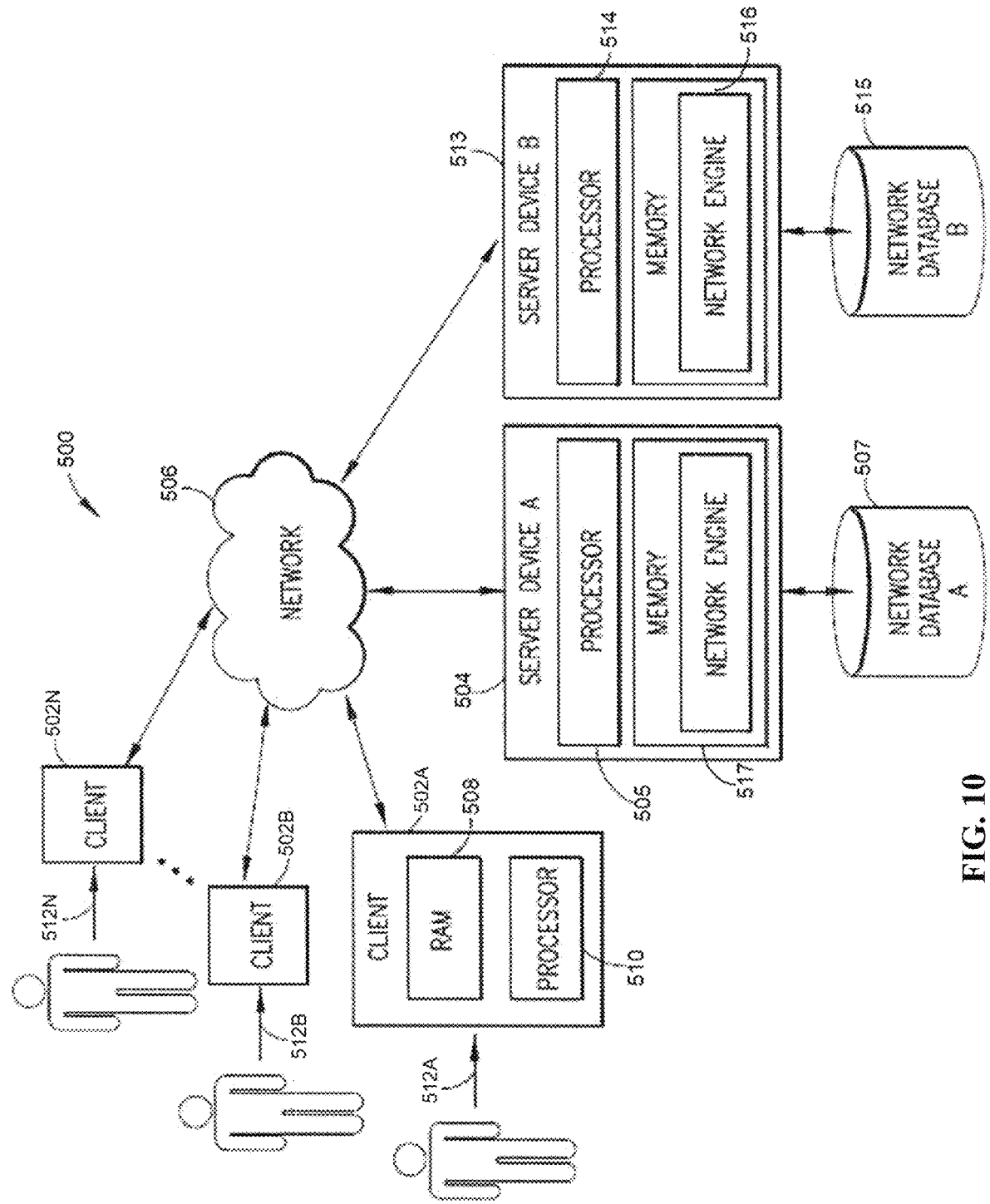
FIG. 10 depicts a block diagram of another exemplary computer-based system/platform in accordance with one or more embodiments of the present disclosure.

FIG. 10 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a-n may also comprise a number of external or internal devices such as a mouse, a CD-ROM, DVD, a physical or virtual keyboard, a display, or other input or output devices. In some embodiments, examples of member computing devices 502a-n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a-n may be specifically programmed with one or more application programs in accordance with one or more principles/methodologies detailed herein. In some embodiments, member computing devices 502a-n may operate on any operating system capable of supporting a browser or browser-enabled application, such as Microsoft™, Windows™, and/or Linux. In some embodiments, member computing devices 502a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a-n, users, 512a-n, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502a-n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 11:
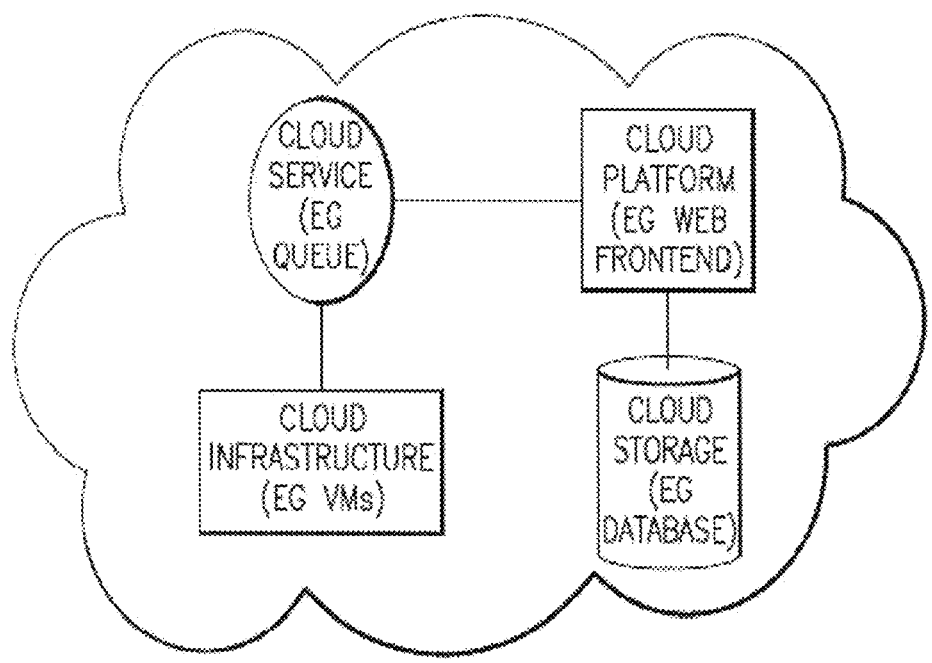
FIGS. 11 and 12 are diagrams illustrating implementations of cloud computing architecture/aspects with respect to which the disclosed technology may be specifically configured to operate, in accordance with one or more embodiments of the present disclosure.
Figure 12:
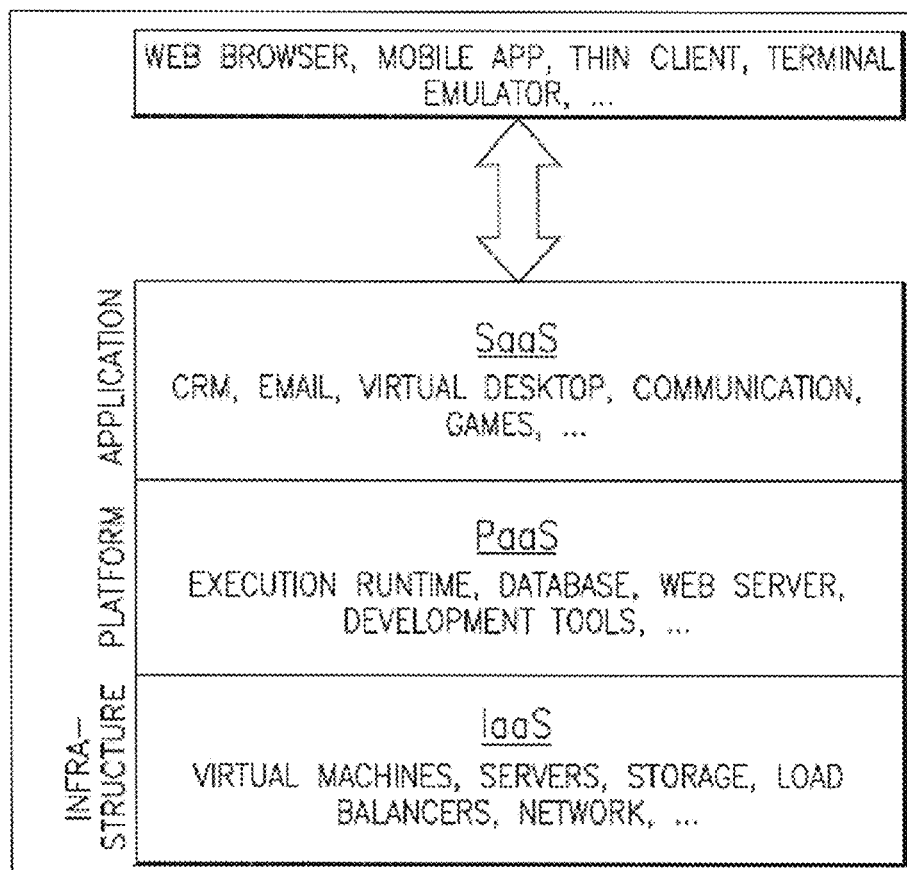

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 11 and 12 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
 i) Define Neural Network architecture/model,
 ii) Transfer the input data to the exemplary neural network model,
 iii) Train the exemplary model incrementally,
 iv) determine the accuracy for a specific number of timesteps,
 v) apply the exemplary trained model to process the newly-received input data,
 vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a method may include:
 generating, by a processor, a training dataset for at least one neural network model;
 wherein the training dataset may include a plurality of data types and word samples belonging to each data type in the plurality of data types;
 training, by a processor, the at least one neural network model using the training dataset;
 wherein the at least one neural network model matches a specific word sample to a specific data type in the plurality of data types;
 receiving, by a processor, a plurality of character strings stored in a plurality of data fields in a first data file;
 wherein the plurality of character strings may include at least one word belonging to at least one data type in the plurality of data types;
 inputting, by a processor, the plurality of character strings from the first data file into the at least one neural network model;
 splitting, by the processor, the at least one word from each of the plurality of character strings in each of the data fields in the plurality of data fields in the first data file using the at least one neural network model;
 matching, by the processor, the at least one word split from each of the plurality of character strings to the at least one data type from the plurality of data types using the at least one neural network model;
 wherein the plurality of data types is respectively represented by a plurality of data field labels;
 outputting by the processor, data field labels from the plurality of data field labels matched to the at least one word split from the plurality of character strings from the first data file;
 receiving, by the processor, an ad hoc selection of at least one data field labels from a user;
 constructing, by the processor, an ad hoc second data file with a plurality of data vectors based on the selection;
 wherein each data vector in the plurality of data vectors may include data fields for words matched to each of the at least one selected data field labels; and
 storing in the data fields, by the processor, the at least one word split from the plurality of character strings for each data type from the plurality of data types matched to each of the at least one selected data field labels.

In some embodiments, the first data file and the ad hoc second data file may be may be selected from the group consisting of a data table, a spreadsheet, an Excel spreadsheet, a key-value store, a JSON object, an AVRO file, and a database file.

In some embodiments, the plurality of data fields may be arranged in an array of rows and columns.

In some embodiments, each column in the array may include data fields of one data type from the plurality of data types designated with a respective data field label from the plurality of data field labels.

In some embodiments, constructing the ad hoc second data file may include arranging the plurality of data vectors as columns in the array of the ad hoc second data file and formatting the columns in the array according to the selection by the user.

In some embodiments, generating the training dataset may include assembling the word samples belonging to each data type in the plurality of data types from a corpus.

In some embodiments, the at least one neural network model may be selected from the group consisting of a classifier neural network model, a convolutional neural network (CNN) model, a recurrent neural network (RNN) model, and a multilayer perceptron network.

In some embodiments, the method may include assigning by the processor using the at least one neural network model, to each character or groups of characters in the plurality of character strings, a probability of belonging to a particular data type from the plurality of data types.

In some embodiments, splitting the at least one word from each of the plurality of character strings may include identifying the at least one word from each of the plurality of character strings using the probabilities assigned to each character or the groups of characters in the plurality of character strings.

In some embodiments, matching the at least one word split from each of the plurality of character strings to the at least one data type from the plurality of data types may include classifying the at least one word split from each of the plurality of character strings as belonging to the particular data type from the plurality of data types based on the assigned probabilities of each character or groups of characters in the plurality of character strings in the at least one word.

In some embodiments, a system may include a memory and a processor. The processor may be configured to:
  generate a training dataset for at least one neural network model;
  wherein the training dataset may include a plurality of data types and word samples belonging to each data type in the plurality of data types;
  train the at least one neural network model using the training dataset;
  wherein the at least one neural network model matches a specific word sample to a specific data type in the plurality of data types;
  receive a plurality of character strings stored in a plurality of data fields in a first data file;
  wherein the plurality of character strings may include at least one word belonging to at least one data type in the plurality of data types;
  input the plurality of character strings from the first data file into the at least one neural network model;
  split the at least one word from each of the plurality of character strings in each of the data fields in the plurality of data fields in the first data file using the at least one neural network model;
  match the at least one word split from each of the plurality of character strings to the at least one data type from the plurality of data types using the at least one neural network model;
  wherein the plurality of data types is respectively represented by a plurality of data field labels;
  output data field labels from the plurality of data field labels matched to the at least one word split from the plurality of character strings from the first data file;
  receive an ad hoc selection of at least one data field labels from a user;
  construct an ad hoc second data file with a plurality of data vectors based on the selection;
  wherein each data vector in the plurality of data vectors may include data fields for words matched to each of the at least one selected data field labels; and
  store the at least one word split from the plurality of character strings for each data type from the plurality of data types matched to each of the at least one selected data field labels.

In some embodiments, the first data file and the ad hoc second data file may be may be selected from the group consisting of a data table, a spreadsheet, an Excel spreadsheet, a key-value store, a JSON object, an AVRO file, and a database file.

In some embodiments, the plurality of data fields is arranged in an array of rows and columns.

In some embodiments, each column in the array may include data fields of one data type from the plurality of data types designated with a respective data field label from the plurality of data field labels.

In some embodiments, the processor may be configured to construct the ad hoc second data file by arranging the plurality of data vectors as columns in the array of the ad hoc second data file and formatting the columns in the array according to the selection by the user.

In some embodiments, the processor may be configured to generate the training dataset by assembling the word samples belonging to each data type in the plurality of data types from a corpus.

In some embodiments, the at least one neural network model may be selected from the group consisting of a classifier neural network model, a convolutional neural network (CNN) model, a recurrent neural network (RNN) model, and a multilayer perceptron network.

In some embodiments, the processor may be further configured to assign by the processor using the at least one neural network model, to each character or groups of characters in the plurality of character strings, a probability of belonging to a particular data type from the plurality of data types.

In some embodiments, the processor may be configured to split the at least one word from each of the plurality of character strings by identifying the at least one word from each of the plurality of character strings using the probabilities assigned to each character or the groups of characters in the plurality of character strings.

In some embodiments, the processor may be configured to match the at least one word split from each of the plurality of character strings to the at least one data type from the plurality of data types by classifying the at least one word split from each of the plurality of character strings as belonging to the particular data type from the plurality of data types based on the assigned probabilities of each character or groups of characters in the plurality of character strings in the at least one word.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:
1. A method, comprising:
  receiving, by a processor, a plurality of character strings stored in a plurality of data fields in a first data file;
  based on at least one neural network model:
    (i) assigning, by the processor, to each character or at least one group of characters in each character string, a probability of belonging to at least one specific data type; and
    (ii) splitting, by the processor, each character string into at least one word based on the probability of belonging to the at least one specific data type;
  wherein the at least one neural network model has been trained to match word samples to data types in a plurality of data types based on a training dataset that comprises the plurality of data types and the word samples belonging to each data type in the plurality of data types;

generating, by the processor, at least one data vector based on at least one predefined format;
  wherein the at least one data vector comprises the at least one word from each of the plurality of character strings for the at least one specific data type; and
constructing, by the processor, a second data file based on the at least one data vector with the at least one predefined format.

2. The method according to claim 1, wherein the first data file and the second data file are selected from the group consisting of a data table, a spreadsheet, an Excel spreadsheet, a key-value store, a JSON object, an AVRO file, and a database file.

3. The method according to claim 1, wherein the plurality of data fields is arranged in an array of rows and columns.

4. The method according to claim 3, wherein each column in the array comprises data fields of one data type from the plurality of data types designated with a respective data type label from a plurality of data type labels.

5. The method according to claim 4, wherein constructing the second data file comprises arranging the at least one data vector as columns in the array of the second data file and formatting the columns in the array according to the at least one predefined format.

6. The method according to claim 1, further comprising generating the training dataset to train the at least one neural network model by assembling word samples belonging to each data type in the plurality of data types from a corpus.

7. The method according to claim 1, wherein the at least one neural network model is selected from the group consisting of a classifier neural network model, a convolutional neural network (CNN) model, a recurrent neural network (RNN) model, and a multilayer perceptron network.

8. The method according to claim 1, wherein outputting each character string with indicia indicating the at least one word comprises highlighting the at least one word in each character string.

9. A system, comprising:
a memory; and
a processor configured to:
  receive a plurality of character strings stored in a plurality of data fields in a first data file;
  based on at least one neural network model:
    (i) assign to each character or at least one group of characters in each character string, a probability of belonging to at least one specific data type; and
    (ii) split each character string into at least one word based on the probability of belonging to the at least one specific data type;
      wherein the at least one neural network model has been trained to match word samples to data types in a plurality of data types based on a training dataset that comprises the plurality of data types and the word samples belonging to each data type in the plurality of data types;
  generate at least one data vector based on at least one predefined format;
    wherein the at least one data vector comprises the at least one word from each of the plurality of character strings for the at least one specific data type; and
  construct a second data file based on the at least one data vector with the at least one predefined format.

10. The system according to claim 9, wherein the first data file and the second data file are selected from the group consisting of a data table, a spreadsheet, an Excel spreadsheet, a key-value store, a JSON object, an AVRO file, and a database file.

11. The system according to claim 9, wherein the plurality of data fields is arranged in an array of rows and columns.

12. The system according to claim 11, wherein each column in the array comprises data fields of one data type from the plurality of data types designated with a respective data type label from a plurality of data type labels.

13. The system according to claim 12, wherein the processor is configured to construct the second data file by arranging the at least one data vector as columns in the array of the second data file and formatting the columns in the array according to the at least one predefined format.

14. The system according to claim 9, wherein the processor is configured to generate the training dataset for training the at least one neural network model by assembling word samples belonging to each data type in the plurality of data types from a corpus.

15. The system according to claim 9, wherein the at least one neural network model is selected from the group consisting of a classifier neural network model, a convolutional neural network (CNN) model, a recurrent neural network (RNN) model, and a multilayer perceptron network.

16. The system according to claim 9, wherein the processor is configured to output each character string with indicia indicating the at least one word by highlighting the at least one word in each character string.

\* \* \* \* \*